United States Patent [19]

Hiles

[11] Patent Number: 5,762,678
[45] Date of Patent: Jun. 9, 1998

[54] CONVERSION OF CELLULOSIC WASTE TO A SOIL IMPROVEMENT COMPLEX

[76] Inventor: Maurice Hiles, P. O. Box 19083, Akron, Ohio 44319

[21] Appl. No.: 692,182

[22] Filed: Aug. 5, 1996

[51] Int. Cl.⁶ .......................... C05F 11/08; C05F 11/00; A01N 25/00
[52] U.S. Cl. .................. 71/23; 71/6; 71/24; 71/64.13
[58] Field of Search .................. 71/64.13, 23–26, 71/6, 7

[56] References Cited

U.S. PATENT DOCUMENTS 5,465,530  11/1995  Santoiemmo ........................ 47/84

Primary Examiner—Gary P. Straub
Attorney, Agent, or Firm—Emerson & Assoc.

[57] ABSTRACT

A method of preparing a moisture retaining cellulose matrix comprising zeolite bonded fibers hollowed by chemical immersion capable of temporally absorbing suitable and essential plant nutrients that are encased in a gelatinous halo, such that the nutrients do not leach and become polutinous to ground water when introduced to the soil. Such soluble nutrients are made readily available to plant roots that are attracted to each growth complex so formed by cellular polarization. Inert micro-organisms present in the matrix are activated on contact with moisture and ingest the cellulose residue over a growing season, a by-product of this process being humic acid the precursor of humus.

24 Claims, 3 Drawing Sheets

CONVERSION OF CELLULOSIC WASTE TO A SOIL IMPROVEMENT COMPLEX

TECHNICAL FIELD

This invention relates to methods of improving and controlling the condition and composition of soil or other solid growing media thus enhancing the rate and quality of plant growth without polluting contiguous ground water.

BACKGROUND ART

Plant growth requires only moisture, air, ultraviolet light and some growing media, liquid or solid, to keep the plant upright. Growth is improved, however, when the plant has access to certain elements. It is generally accepted that three are essential, namely, nitrogen, potassium, and phosphorous. However, it has recently been shown that plants also benefit by the presence of silicon especially in the form of silicic acid. This requirement has probably been overlooked as silicon, being the second most abundant solid, is present in most soil compositions. Silicon also has the property of promoting an electrical potential difference between roots and stem that stimulates healthy development. Certain trace elements such as iron, copper, zinc, magnesium and manganese et al also contribute to plant growth.

Edible plants can become the source of valuable medication with the uptake of specific soluble salts; for example chromium picolinate to induce the synthesis of insulin to aid persons suffering from diabetes mellitus and calcium citrate to control the onset of osteoporosis.

Plants can benefit from these nutrients by natural or artificial sources. A natural source usually refers to decomposing vegetation or animal excreta. As environmentally friendly as this system sounds, it has disadvantages. Firstly, it is difficult or, maybe impossible, to predict the exact composition of the nutrients which will, most certainly, vary considerably. Secondly, the absorption rate by the plant depends on the state of decomposition. Lastly, there is the possible spread of disease especially where animal feces (eg. horse or chicken manure) is involved.

On the other hand, the presence of synthetic material, especially those in the form of soluble salts, can also cause problems. It has been found that when introduced to soil in which a plant is embedded, only about 8% remains in the domain of the plant roots. The residue rapidly filters and is lost into the water table, creating pollution problems. Unbonded inorganic materials are, therefore, not only an environmental hazard, but are an extremely short-term nutrient supply, sometimes requiring reapplication every two weeks. As such, they are very uneconomical.

In the art, it is known to utilize slow-release synthetic systems which generally consists of nutrients encapsulated in a soluble or bio-degradable polymer. Such systems are comparatively expensive and are not suitable for many growing purposes. Adequate moisture is even required by the slow-release systems, generally more than ambient rainfall and morning dew can provide. Artificial watering is usually needed which can be expensive, or in arid conditions, not practical.

An economical method of supplying nutrients to growing plants that is scientifically and hygienically controlled and is integral with a system to store and provide moisture in both normal conditions and in conditions of draught but does not violate natural environmental laws, for example, by causing groundwater pollution by migration of uncontrollable leaching of the chemical nutrient contents is required.

Nearly half of all municipal waste is cellulose based. Cellulose is a long chain molecule of high molecular weight that occurs naturally in fibrous forms as the structural tissue in the cell walls of plants. It does not readily biodegrade. In waste it is present as paper, cardboard, natural fabric such as cotton, grass clippings and wood chips. The present invention provides means for converting cellulose based waste to a soil improvement complex.

SUMMARY OF THE INVENTION

The present invention is directed to a soil improvement complex and method of preparing the same in order to economically supply scientifically and hygienically controlled nutrients to growing plants. The complex includes means to provide and store moisture for plant utilization under normal and arid conditions. The likelihood of groundwater pollution by migration of uncontrollable leaching of the chemical nutrients is greatly reduced by the practice of the present invention.

More particularly, the present invention is directed to a matrix comprising a multiplicity of micro-capillaries consisting of hollow cellulosic fibers containing selected soluble plant nutrients supported by a bonding agent.

According to one aspect of the invention, such a matrix also embodies an hydrogel or crystalline sponge to store moisture over substantial periods.

According to another aspect of the invention, the matrix is impregnated with the carbonyl form of iron or ferrite that is polarized to impart a potential difference to the matrix extremities thus attracting plant roots to the matrix core and a source of nutrients.

According to another aspect of the invention, the matrix conglomerate is substantially restrained by an halo of gelatinous surfactant.

According to yet another aspect of the invention, suitable micro-organisms are provided to ingest the cellulose fibers over a growing period in order to benefit the general condition of the soil.

According to yet another aspect of the invention, a method for producing a soil enhancing complex is provided. The method includes the steps of introducing cellulosic material comprising fine textured fibers having soft cores into a reaction chamber, reacting the cellulosic material with an oxidizing agent in the reaction chamber for sufficient time to strip the fibers of their soft cores and form a multiplicity of highly absorbent micro-capillaries in the cellulosic material, introducing an anionic colloidal solution of a polarizing medium to the reaction chamber, introducing a binding agent to the reaction chamber, introducing the nutrients to the reaction chamber, introducing a surfactant gel to the reaction chamber, introducing a hydrogel to the reaction chamber, mixing the polarizing medium, binding agent, nutrients, surfactant gel and hydrogel with the cellulosic material after the micro-capillaries are formed in order to form a plant nutrient mixture, shaping the plant nutrient mixture into pellets, polarizing the pellets by imparting a potential difference to the polarizing medium, and, dusting an outer surface of the pellets with a source of dormant micro-organisms, the dormant micro-organisms being moisture-activated and able to ingest cellulosic material when activated.

According to another aspect of the invention an oxidizing agent comprising a saturated anionic solution of phosphorus pentoxide in which anhydrous pentoxide is dissolved in water molecules having phase angles of up to 135° is provided.

According to another aspect of the invention, polarized pellets are provided by subjecting the pellets to a magnetic field of strength of between approximately 5000 to 20,000 KGaus for a period of approximately 1 to 10 micro seconds.

One advantage of the present invention is the low cost at which the soil improvement complex can be made.

Another advantage of the present invention is the high concentration of nutrients that remains accessible to the plant eliminates the need for reapplication within a single growing season.

Another advantage of the present invention is the provision of a gelatinous coating which prevents possible "seed burn" and chemical damage to plant roots.

Another advantage of the present invention is the provision of a supplementary source of moisture in conditions of draught.

Another advantage of the present invention is that the release of nutrients is dictated by action by the plant itself, rather than the "slow-release" pellets which discharge their nutrients regardless of plant need but only in the presence of moisture.

Another advantage of the present invention is the polarization of the soil enhancing complex which attract the plant's roots.

Another advantage of the present invention is a reduction in waste of nutrients which reduces volumetric requirements.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
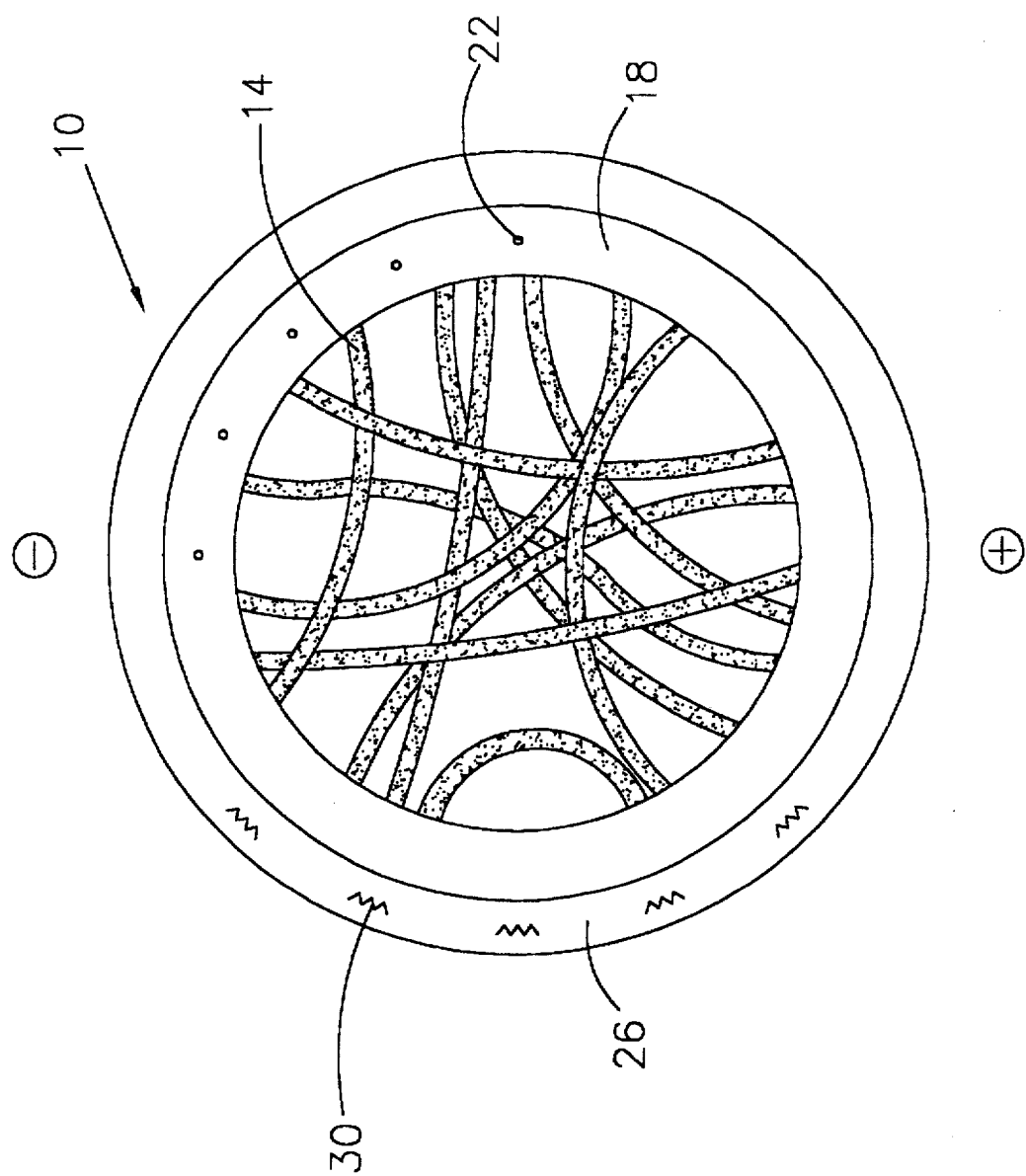
FIG. 1 is a schematic representation of one embodiment of the soil enhancing complex according to the present invention.

The general features of the soil enhancing complex according to the present invention will be now be described. In the preferred embodiment of the present invention, cellulose is utilized as a starting material. The preferred source of cellulose is cellulosic waste such as paper, cardboard, natural fabric, grass clippings and wood chips. The cellulosic waste may be easily reduced to a fine texture by methods which will be disclosed in detail later in this specification. If individual fibers of the fine-textured waste are examined, it is seen that they are composed of a vascular cambium or bark consisting of long fibers, which are primary blast fibers, and a core that consists of some secondary fibers of intermediate length and a predominance of libriform or ultra short fibers. Treatment of the cellulosic material with a suitable oxidizing agent strips the fibers of their libriform pith leaving a multiplicity of micro-capillaries that will absorb and store soluble or colloidal substances.

The preferred oxidizing agent is a saturated anionic solution of phosphorus pentoxide at an elevated temperature of about 60° C. By an anionic solution of phosphorous pentoxide ($P_4O_{10}$) is meant one in which the anhydrous pentoxide is dissolved in water that has been polarized by passing it through a substantial magnetic field. The phase angle between the hydro-oxy (H—O) bonds of the water molecule in the passive state is 105°, but when subjected to a substantial electro-magnetic flux of at least 20,000 KGaus, the angle can be increase to as much as 135°. Thus the solubility product quotient is considerable enhanced, and the ion concentration of the electrolyte is, at least, tripled. The anionic solution may be regarded as a "super concentrate". The cellulosic material is supplied with the essential nutrient phosphorous during this process.

The treated cellulosic matrix may then be infused with suitable soluble plant nutrients, in addition to the phosphorous. The nutrients to be added may include potassium, nitrogen, sulphur, and silicon. Also, the soluble salts of trace elements such as iron, zinc, copper, manganese, magnesium, boron, selenium, chromium, calcium as well as amino acids may be introduced to the treated cellulosic matrix.

As shown in the examples that follow, relative amounts of the various plant nutrients may be adjusted in order to achieve desired ratios of nitrogen, phosphorous, potassium and other elements. The nutrient combination may be either acidic or alkaline depending on the intended usage. Means for adjusting the pH level may be employed. In the preferred embodiment, the pH level is controlled by the nutrient formulation.

Cohesion of the matrix is desirable to reduce the incidence of leaching and may be achieved by the addition of a suitable binding agent. A binding agent derived from silicic acid possessing both hydroxyl and carboxyl groups capable of electrovalent bonding is preferred. In a preferred embodiment, potassium silicate is utilized. The binding agent may, however, be any suitable material such as one chosen from the family of zeolites. This compound also supplies a source of potassium, an essential nutrient, and silicon, recently accepted as being important to plant growth.

In order to further prevent the incidence of leaching of soluble nutrients from the cellulosic matrix into groundwater supplies, an additional feature is added to the matrix. A surfactant gel may be used to enhance the resistance to leaching. By the term "gel", it is meant a two phase colloidal system consisting of a solid in a liquid or continuous phase. The preferred system is a high molecular weight block co-polymer of polyoxypropylene and polyoxyethylene with a predominance of the latter. The gel is formed by hydrogen bonding in the aqueous phase resulting from the attraction of the surfactant ether oxygen atoms to the water protons. Such a system provides the matrix with a retaining gelatinous coating through which plant roots can penetrate to obtain the nutrients. Preferably, the surfactant gel is added into a main reaction chamber along with the other nutrients.

It is advantageous to provide the plant with a source of moisture which is accessible during conditions of draught. To be beneficial to the plant over the course of a growing season, the moisture must be able to be stored for a period of time and replenishable when exhausted. In a preferred embodiment, a crystalline hydrogel ammonium salt is included in the soil enhancing complex. Preferably, the hydrogel is a monobasic organic acid quaternary ammonium chloride. The hydrogel can store many times its own volume of water over long periods and can also supply the plant with nitrogen.

It has been found that plant roots are attracted by an electrical potential difference in the soil enhancing complex. The presence of silicon found in the binding agent presents a slight potential difference. The value of the charge can be enhanced by the addition of small quantities of the carbonyl form of iron or ferrite. The entire matrix may then be subjected to a suitable magnetic or polarizing field. It should be understood that the charge must be sufficient to attract plant roots, but not so great as to cause agglomeration of the matrix segments by polar attraction.

The soil enhancing complex should be capable of being dispersed using conventional agricultural methods. Therefore, the preferred embodiment of the invention includes means for forming pellets from the cellulosic matrix.

As was stated previously, cellulose is not readily biodegradable. Therefore, it is desirable to add a source of cellulase enzyme to the pellets. The term "cellulase enzyme" refers to several enzymes which catalyze decomposition of cellulose. Certain bacteria and fungi are known sources of cellulase enzyme. Examples include cellulase-producing species of the bacterium Mycorrhiza and Actinomyces and the fungi Phanerochaete Chrysosporium, also known as "wood rot". Wood rot has the added benefit of being able to degrade harmful lignin from wood pulp and dioxin residue left from any paper bleaching process. In the preferred embodiment, the pellets are dusted with a dried form of dormant micro-organisms that may be activated by the presence of moisture. Once the micro-organisms are activated by moisture, they ingest the cellulose residue, producing humic acid, the precursor to soil-enriching humus.

Referring now to the drawings wherein the showings are for purposes of illustrating a preferred embodiment of the invention only and not for purposes of limiting the same, FIG. 1 shows a schematic representation of some of the features of a sample pellet 10 of the soil enhancing complex of the present invention. Cellulosic material 14 is found at the core of the soil enhancing complex and includes a multiplicity of highly absorbent micro-capillaries. Initial treatment of the cellulosic material 14 by methods disclosed in this specification creates the system of micro-capillaries which readily absorbs moisture and plant nutrients. Impregnated within the cellulosic material 14 are plant nutrients. The specific composition of nutrients depends on the particular application for which the pellet 10 is designed. However, generally there will be present such essential nutrients as nitrogen, phosphorous, silicon, sulphur, potassium et al.

The cellulosic material 14 is generally surrounded by a moisture-retaining hydrogel 18. The hydrogel 18 may be impregnated with a polarizing medium, as for example, particles of the carbonyl form of iron or ferrite 22 that have been polarized to impart a potential difference to the pellet 10 as indicated by the (+) and (−) symbols.

The pellet 10 includes a restraining halo of gelatinous surfactant 26 which surrounds the cellulosic material 14 and the hydrogel 18. The particles of the polarizing medium may also be found within the gelatinous surfactant 26.

In the preferred embodiment, the pellet includes a dusting of dormant cellulase-containing micro-organisms 30 on the outer surface.

Figure 2:
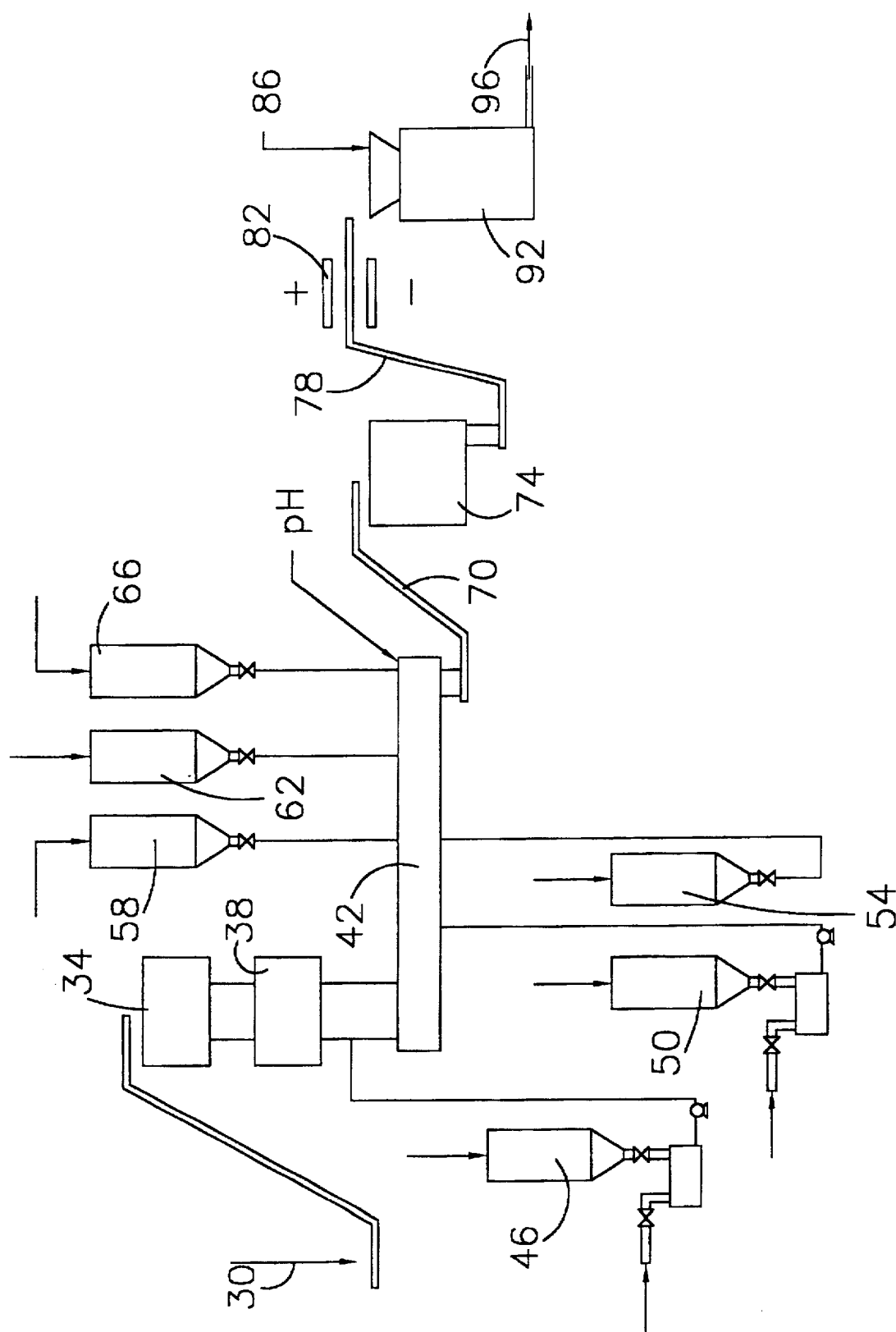
FIG. 2 is a schematic representation of the process used to make the soil enhancing complex according to the present invention.

The process of preparing the soil enhancing complex will be described with reference to FIG. 2. Cellulosic waste enters the process as indicated by arrow 30, where it is conveyed to a shredder 34 and then to a hammer mill 38 where it is reduced to fine textured fibers. In a crucial step of the present invention, the fibers are introduced to the reaction chamber 42 along with the sterilizing and oxidizing agent from the sterilizing feeding system 46 where the fibers are stripped of their soft cores. It is this stripping that creates the network of highly absorbent micro-capillaries that will become impregnated with the plant nutrients. As stated earlier, the preferred oxidizing agent is a saturated anionic solution of phosphorus pentoxide in which the anhydrous pentoxide is dissolved in water having a phase angle of up to 135° to effectively create a "super concentrate" solution. After sufficient time has elapsed, an anionic colloidal solution of the polarizing medium such as finely divided iron is fed from a feed system 50 into reaction chamber 42. The crystalline form of the binding agent, such as potassium silicate, is then fed from the binder feed system 54 to the reaction chamber 42. Nutrients are fed from the nutrient feed system 58 to reaction chamber 42. The particular amounts and kind of nutrients fed to the reaction chamber 42 is dependent on the end use of the soil enhancing complex. Next, the surfactant gel feed system 62 introduces the surfactant gel to the reaction chamber 42. Lastly, the hydrogel feed system 66 introduces the hydrogel to the reaction chamber 42. Each of the components fed to the reaction chamber 42 is thoroughly mixed with other components in the reaction chamber 42. The mixing is necessary, but the parameters governing the mixing are not critical to the invention. While the above mixture is retained in the reaction chamber, means for controlling and adjusting the pH may be employed. Preferably though, the pH is regulated by the nutrient formulation itself.

The reaction mixture is then transferred by conveying means 70 to a pelletizer 74 to shape the mixture into pellets which can be dispersed by conventional agricultural means. In the preferred embodiment, the pellets 10 are spherical in shape. The pellets are then conveyed by additional conveying means 78 to a polarizing means such as an electromagnetic coil 82 where a potential difference is introduced to the pellets due to the presence of the polarizing medium. In the preferred embodiment, the pellets are subjected to a magnetic field of strength of between approximately 5000 to 20,000 KGaus for a period of approximately 1 to 10 micro seconds so that the polarity is determinable and measurable with conventional instrumentation, but individual pellets do not agglomerate. The pellets are then treated with dormant micro-organisms as indicated by arrow 86 before being fed to a packing system 92. The final product of the soil enhancing complex emerges from the system as indicated by arrow 96.

The following examples are given for illustrative purposes only and are not intended as limiting the scope of the present invention:

EXAMPLE I

Basic Formulation:

| Element | Parts by Weight | Source |
| --- | --- | --- |
| Nitrogen | 15 | carbamide |
| Phosphorus | 5 | from oxidizing/sterilizing process |
| Potassium | 4 | from binding process |
| Silicon | 1 | from binding process |

EXAMPLE II

Formulation for plants requiring growth conditions>pH7:

| Element | Parts by Weight | Source |
|---|---|---|
| Nitrogen | 30 | carbamide and hydrogel |
| Phosphorus | 10 | from oxidizing process |
| Potassium | 10 | from binding agent |
| Silicon | 5 | from binding agent |
| Copper | 0.5 | Copper Sulfate (chelated Cu) |
| Iron | 0.35 | Ferrous Sulfate and/or well water |
| Manganese | 0.05 | Manganese Nitrate |
| Zinc | 0.05 | Zinc Sulfate (chelated Zn) |
| Trace | 1.07 | Various soluble mineral salts |

EXAMPLE III

Formulation for plants requiring growth conditions<pH7:

| Element | Parts by Weight | Source |
|---|---|---|
| Nitrogen | 10 | carbamide and hydrogel |
| Phosphorus | 15 | from oxidizing/sterilizing process |
| Potassium | 5 | from binding process |
| Silicon | 5 | from binding process |
| Acid | 5 | citric acid |
| Copper | 0.5 | Copper Sulfate (chelated Cu) |
| Iron | 0.5 | Ferrous Sulfate and/or well water |
| Manganese | 0.05 | Manganese Nitrate |
| Zinc | 0.05 | Zinc Sulfate (chelated Zn) |
| Trace | 1.5 | Various soluble mineral salts |

Growth Studies

TIMEBASE:

Each study covered a period of 6 weeks.

STUDY CONDITIONS:

Each specimen plant was placed in a separate pot. Each pot was filled with 350 grams of sterilized soil. The plants were cultivated at a temperature of 20° C. with varying but identical light conditions. The pots were watered on a daily basis with 100 ml of deionized water.

SCOPE OF STUDY:

Three types of plants indigenous to the study location but with differing growth patterns were chosen:

I. tomato (*lycopersicum esculentum*);

II. string or snap bean (*phafeolus vulgaris*);

III. castor bean (*ricinus communis*).

Four plants of each species were cultivated in each of three groups:

A. No fertilizer

B. Commonly used fertilizer (Peters soluble)

C. One pellet of the soil enhancing complex according to the present invention.

The pellet weighed approximately 0.2 grams and was placed about 1 cm beneath the roots of each plant.

Figure 3:
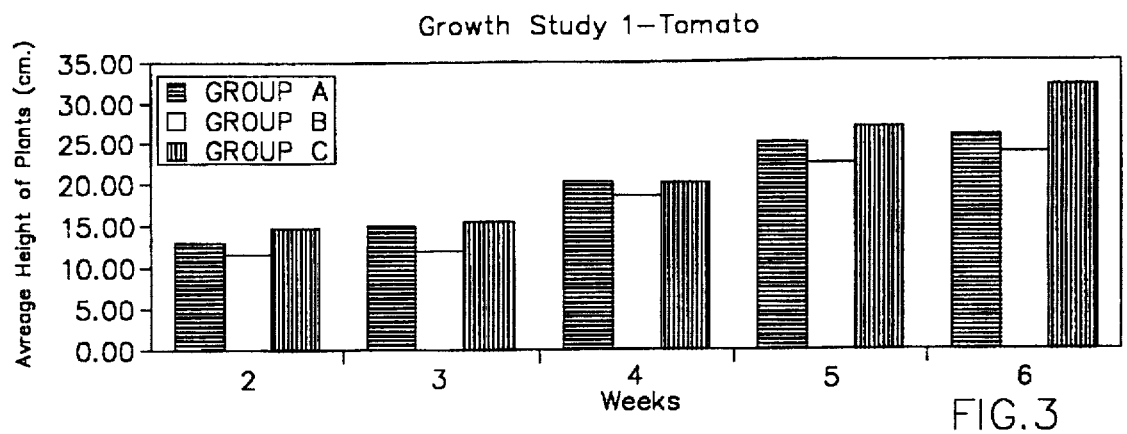
FIG. 3 is a graphic representation of a growth study.
Figure 4:
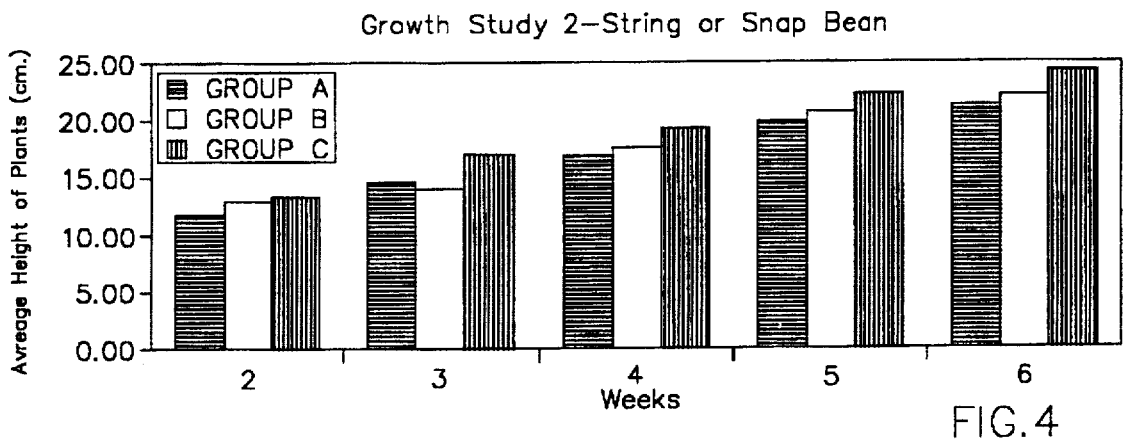
FIG. 4 is a graphic representation of another growth study.
Figure 5:
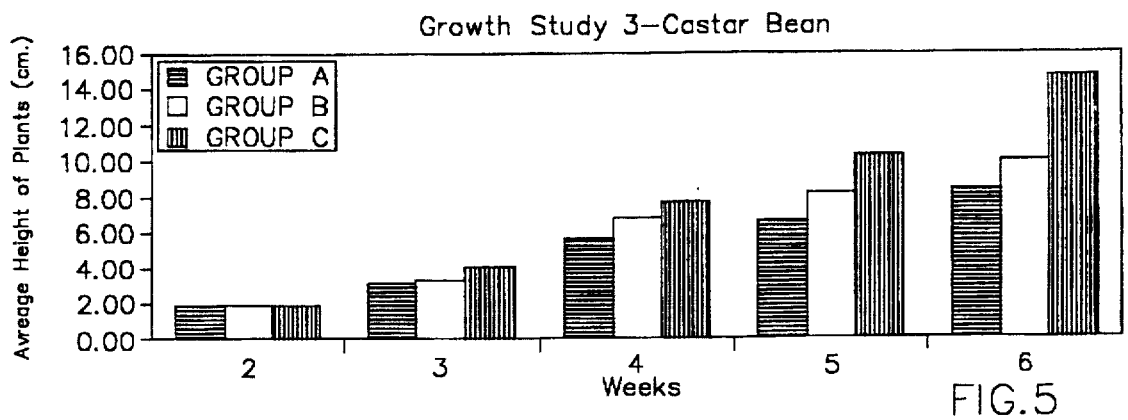
FIG. 5 is a graphic representation of yet another growth study.

RESULTS:

The results are summarized in FIGS. 3–5. In each study I–III, after a 6 week growing period, the plants grown under condition C (with soil enhancing complex) surpassed the plants grown under conditions A and B in terms of average height of the plants.

Leaching Studies

The following experiment was utilized to determine the degree of leaching of the nutrients from the soil enhancing complex of the present invention.

Four pellets weighing a total of 0.75 grams made according to the formulation of Example II were placed in a glass beaker. 250 ml of deionized water was added at a temperature of 20° C. at ambient pressure. The mixture was not agitated. The degree to which the nutrients leach from the soil enhancing complex is related to the pH value of the water.

Data:

| Time (in Days) | pH |
|---|---|
| 1 | 7.0 |
| 2 | 7.0 |
| 3 | 7.0 |
| 4 | 7.1 |
| 5 | 7.1 |
| 6 | 7.1 |
| 7 | 7.1 |

After 7 days the temperature of the water was raised to and maintained at 50° C.

| Time (in Days) | pH |
|---|---|
| 8 | 7.2 |
| 9 | 7.2 |
| 10 | 7.2 |
| 11 | 7.2 |
| 12 | 7.2 |

RESULTS:

It was concluded that in temperate climatic conditions and in extreme tropical conditions, the degree of leaching to contiguous groundwater is negligible and may be disregarded.

The preferred embodiments of the invention have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A soil improvement complex comprising:
    a core of hollow cellulosic natural fibers containing micro-capillaries formed into a non-woven mass, said mass being impregnated with plant nutrients and bound by a siliceous binding agent;
    a moisture-retaining hydrogel surrounding the core, the hydrogel being permeable to plant roots; and,
    a retaining coating comprising an organic gelatinous polymer.

2. The soil improvement complex of claim 1 further comprising a magnetic polarized medium distributed in the hydrogel, said magnetic polarized medium being able to retain a potential difference imparted to the soil improvement complex for attracting plant roots.

3. The soil improvement complex of claim 1 wherein the hydrogel is a monobasic organic acid quaternary ammonium chloride.

4. The soil improvement complex of claim 1 wherein said organic gelatinous polymer is a block copolymer comprising polyoxypropylene and polyoxyethelene.

5. The soil improvement complex of claim 1 wherein one of the nutrients is phosphorous being supplied by an anionic solution of phosphoric oxidizing complex.

6. The soil improvement complex of claim 5 wherein the phosphoric oxidizing complex is a saturated anionic solution of phosphorus pentoxide in which anhydrous pentoxide is dissolved in water having a phase angle greater than 105° and up to 135°.

7. The soil improvement complex of claim 1 wherein the binding agent is a silicate.

8. The soil improvement complex of claim 1 further comprising:

a dormant source of cellulase enzyme located on an outer surface of said organic gelatinous polymer, the dormant source being moisture-activated.

9. The soil improvement complex of claim 8 wherein the dormant source of cellulase enzyme is selected from the group consisting of cellulase-producing species of the bacterium Mycorrhiza and Actinomyces and the fungi Phanerochaete Chrysosporium.

10. The soil improvement complex of claim 1 wherein the nutrients include one or more soluble salts of elements taken from the group consisting of: nitrogen, oxygen, potassium, phosphorus, silicon, magnesium, sulphur, boron, selenium, chromium, calcium, zinc, copper, manganese, and iron.

11. The soil improvement complex of claim 1 wherein the nutrients include potassium, nitrogen, silicon, and sulphur.

12. The soil improvement complex of claim 11 wherein potassium and silicon are supplied by the binding agent.

13. A soil improvement complex in the form of a pellet including the nutrients of nitrogen, phosphorous, and potassium comprising:

a core of hollow cellulosic natural fibers containing micro-capillaries formed into a non-woven mass, said mass being impregnated with the plant nutrients and bound by a siliceous binding agent comprising potassium silicate;

a moisture-retaining hydrogel surrounding the core, the hydrogel being permeable to plant roots, the hydrogel being selected from the group consisting of ammonium chloride or methyl cellulose;

finely divided magnetized particles distributed in the hydrogel able to retain an imparted potential difference in the soil improvement complex;

a retaining coating comprising an organic gelatinous polymer comprising a block copolymer, the retaining coating being permeable to plant roots; and, dormant micro-organisms located on an outer surface of said organic gelatinous polymer, the dormant micro-organisms being moisture-activated and able to ingest cellulosic material when activated.

14. The soil improvement complex of claim 13 wherein the pellet is spherical in shape.

15. A method for producing a soil improvement complex including the nutrients of nitrogen, phosphorous, and potassium, the method comprising the steps of:

introducing natural cellulosic material comprising fine textured fibers having soft cores into a chemical treatment chamber;

reacting the cellulosic material with an oxidizing agent in the chemical treatment chamber for sufficient time to strip the fibers of their soft cores and form a plurality of non-woven cores containing highly absorbent micro-capillaries;

after forming said plurality of non-woven cores, sequentially introducing to the chemical treatment chamber:
a) a siliceous binding agent;
b) the nutrients;
c) a hydrogel; and,
d) an organic gelatinous polymer while mixing; and, shaping the plant nutrient mixture into agglomerated pellets.

16. The method of claim 15 wherein the oxidizing agent is a saturated anionic solution of phosphorus pentoxide in which anhydrous pentoxide is dissolved in water molecules having phase angles greater than 105° and up to 135°.

17. The method of claim 16 wherein the water molecules are subjected to a magnetic flux of at least 20,000 KGaus in order to attain the phase angles of up to 135° before the anhydrous pentoxide is dissolved therein.

18. The method of claim 15 wherein the binding agent is potassium silicate.

19. The method of claim 15 wherein the nutrients further include soluble salts of elements taken from the group consisting of: sulphur, zinc, copper, manganese, and iron.

20. The method of claim 15 wherein the step of shaping the plant nutrient mixture into pellets comprises forming spherical-shaped pellets.

21. The method of claim 15 wherein the introducing step further includes:

e) introducing an anionic colloidal magnetic polarizing medium to the chemical treatment chamber.

22. The method of claim 21 wherein the polarizing medium comprises finely divided iron-containing particles.

23. The method of claim 21 further comprising the step of:

polarizing the pellets by subjecting said pellets to a magnetic field.

24. The method of claim 23 wherein the step of polarizing the pellets comprises:

subjecting the pellets to a magnetic field of strength of between approximately 5000 to 20,000 KGaus for a period of approximately 1 to 10 micro seconds.

* * * * *